United States Patent
Ellson et al.

[19]

[11] Patent Number: 5,805,783
[45] Date of Patent: Sep. 8, 1998

[54] METHOD AND APPARATUS FOR CREATING STORING AND PRODUCING THREE-DIMENSIONAL FONT CHARACTERS AND PERFORMING THREE-DIMENSIONAL TYPESETTING

[75] Inventors: Richard N. Ellson; Lawrence A. Ray, both of Rochester, N.Y.

[73] Assignee: Eastman Kodak Company, Rochester, N.Y.

[21] Appl. No.: 402,461

[22] Filed: Mar. 10, 1995

Related U.S. Application Data

[63] Continuation of Ser. No. 884,969, May 15, 1992, abandoned.

[51] Int. Cl.⁶ .................................................. G06F 17/21
[52] U.S. Cl. ...................... 395/168; 395/119; 395/948; 355/22; 396/324
[58] Field of Search .............. D18/24–33; 395/150–151, 395/119–127, 167–172, 947–948, 774; 345/26, 141, 143, 144; 355/33, 22; 359/455, 458, 463; 348/59; 353/32; 396/306, 327, 330

[56] References Cited

U.S. PATENT DOCUMENTS

| D. 153,752 | 5/1949 | Baker | D18/24 |
|---|---|---|---|
| D. 156,241 | 11/1949 | Jochim | D18/24 |
| D. 177,504 | 4/1956 | Jackson | D25/1 |
| 3,254,436 | 6/1966 | Bank | 30/130 |
| 3,602,702 | 8/1971 | Warnock | 235/151 |
| 3,822,487 | 7/1974 | Koch | 35/35 J |
| 3,934,357 | 1/1976 | Couvillion | 35/31 G |
| 4,195,338 | 3/1980 | Freeman | 364/200 |
| 4,251,871 | 2/1981 | Yu | 364/518 |
| 4,283,765 | 8/1981 | Rieger | 364/521 |

(List continued on next page.)

FOREIGN PATENT DOCUMENTS

| 59-214855 | 7/1984 | Japan . |
|---|---|---|
| 63-103380 | 5/1988 | Japan . |
| 63-131270 | 6/1988 | Japan . |
| 3-138697 | 6/1991 | Japan . |

OTHER PUBLICATIONS

"Typestry Turns Fonts Into 3–D Images" Aug. 10, 1992, PC Week Software, p. 34.
Principles of Interactive Computer Graphics, by William M. Newman & Robert F. Sproull, pp. 111–119.
"Designer Letters" by Cynthia Baron and Renee LeWinter pp. 73–74, 77–78.
"3–D Displays", BYTE, May 1992.
"Voxels: Data in 3–D", BYTE, May 1992.
Flying Logos, MacWorld, p. 119, Oct. 1992.
Pixar Typestry, MacWorld, pp. 148–149, Nov. 1992.
Pixar Typestry Advertisement, MacWorld, Nov. 1992.
Jim Heid, "StrataType 3d 1.0", Mar. 1993, MacWorld, p. 174.

(List continued on next page.)

*Primary Examiner*—Joseph H. Feild
*Attorney, Agent, or Firm*—Edward Dugas

[57] ABSTRACT

A system and method for creating three-dimensional or depth image font text characters using graphic three-dimensional object creation techniques and graphics processors. The text characters can be represented as set descriptions of the characters. The text characters can also be represented as a three-dimensional geometric model including polygons constructed from vertices defined by three-dimensional coordinates. The representations are stored in a font storage and when a user specifies the text characters to be used in a depth image along with the font to be used for the text characters, the geometric representations of the characters are retrieved. If stored as a set, the set is converted into a geometric plot. Appropriate scaling and surface texturing operations are performed as designated by the user to create three-dimensional text character graphic objects. These text character graphic objects are transferred to a graphics processor to be manipulated as desired by the and used to produce an image that can be further processed.

18 Claims, 7 Drawing Sheets

U.S. PATENT DOCUMENTS

| | | | |
|---|---|---|---|
| 4,375,079 | 2/1983 | Ricketts et al. | 364/518 |
| 4,594,674 | 6/1986 | Boulia et al. | 364/523 |
| 4,609,917 | 9/1986 | Shen | 340/729 |
| 4,648,045 | 3/1987 | Demetrescu | 364/518 |
| 4,688,182 | 8/1987 | Schrieber | 364/523 |
| 4,752,828 | 6/1988 | Chapuis et al. | 358/183 |
| 4,758,965 | 7/1988 | Liang et al. | 364/518 |
| 4,774,508 | 9/1988 | Kitahara et al. | 340/728 |
| 4,775,946 | 10/1988 | Anjyo | 364/522 |
| 4,803,643 | 2/1989 | Hickey | 395/774 |
| 4,805,117 | 2/1989 | Fiore et al. | 364/518 |
| 4,811,241 | 3/1989 | Liang | 364/518 |
| 4,821,209 | 4/1989 | Hempel et al. | 364/518 |
| 4,821,214 | 4/1989 | Sederberg | 364/522 |
| 4,841,453 | 6/1989 | Finlay et al. | 364/519 |
| 4,853,971 | 8/1989 | Nonura | 382/56 |
| 4,893,257 | 1/1990 | Dominguez, Jr. | 364/519 |
| 4,907,282 | 3/1990 | Daly et al. | 382/9 |
| 4,930,092 | 5/1990 | Reilly | 364/522 |
| 4,931,960 | 6/1990 | Morikawa | 364/519 |
| 4,935,335 | 6/1990 | Fotland | 430/324 |
| 4,945,500 | 7/1990 | Deering | 364/522 |
| 4,967,392 | 10/1990 | Werner et al. | 364/900 |
| 4,990,903 | 2/1991 | Cheng et al. | 340/731 |
| 4,992,780 | 2/1991 | Penna et al. | 340/729 |
| 4,998,210 | 3/1991 | Kadono et al. | 364/518 |
| 5,060,172 | 10/1991 | Engelse et al. | 364/522 |
| 5,068,808 | 11/1991 | Wake | 395/118 |
| 5,077,608 | 12/1991 | Dubner | 358/183 |
| 5,091,867 | 2/1992 | Clark et al. | 395/162 |
| 5,159,665 | 10/1992 | Priem et al. | 395/134 |
| 5,163,759 | 11/1992 | Jambor et al. | 400/29 |
| 5,179,638 | 1/1993 | Dawson et al. | 395/125 |
| 5,197,013 | 3/1993 | Dundorf | 364/474.24 |
| 5,255,353 | 10/1993 | Itoh | 395/126 |
| 5,257,345 | 10/1993 | Malm | 395/119 |

OTHER PUBLICATIONS

Shaun Love and David McAllister, SPIE, vol. 1083, Three–Dimensional Visualization And Display Technologies (1989), "Computer Generated Lenticular Stereograms", pp. 102–107.

H. Fuchs, et al. Computer Graphics, vol. 23, No. 3, Jul. 1989, "Heterogeneous Multiprocessor Graphics System Using Processor–Enhanced Memories", pp. 79–88.

Byte Magazine, Jan., 1993, vol. 18, No. 1, "TOPAS 4.0 Simplifies 3D", p. 231.

David Mcallister, Byte, May 1992, "3–D Displays", pp. 183–184, 186, and 188.

Vincent Argiro and William Van Zandt, Byte, May, 1992, "Voxels: Data in 3–D", pp. 177–180 and 182.

William Newman and Robert Sproull, "Principles Of Interactive Computer Graphics", 1979, second edition, McGraw–Hill Book Company: New York, pp. 111–119.

Cynthia Baron and Renee LeWinter, Computer Graphics World, Nov., 1991, "Designer Letters", pp. 73–74 and 77–78.

Author unknown, PC Week Software, Aug. 10, 1992, "Tapestry Turns Fonts Into 3–D Images", p. 34.

MacWorld, Nov., 1992, "Pixar Typestry"advertisement.

Foley et al, Computer Graphics: Principles and Practice, 2d ed in C, pp. 32–33, 612–615, 728–731, 754–757, 1990.

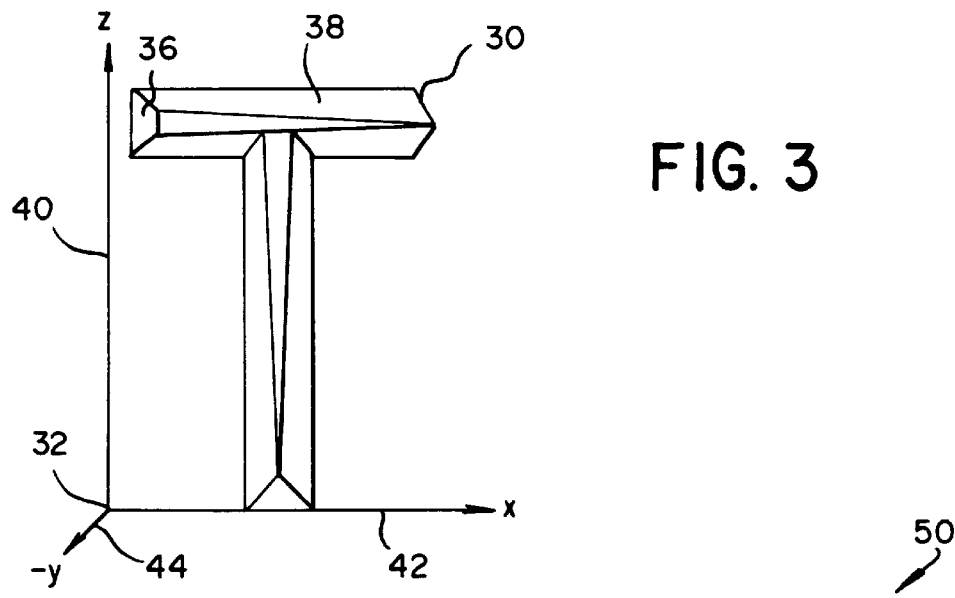
FIG. 3
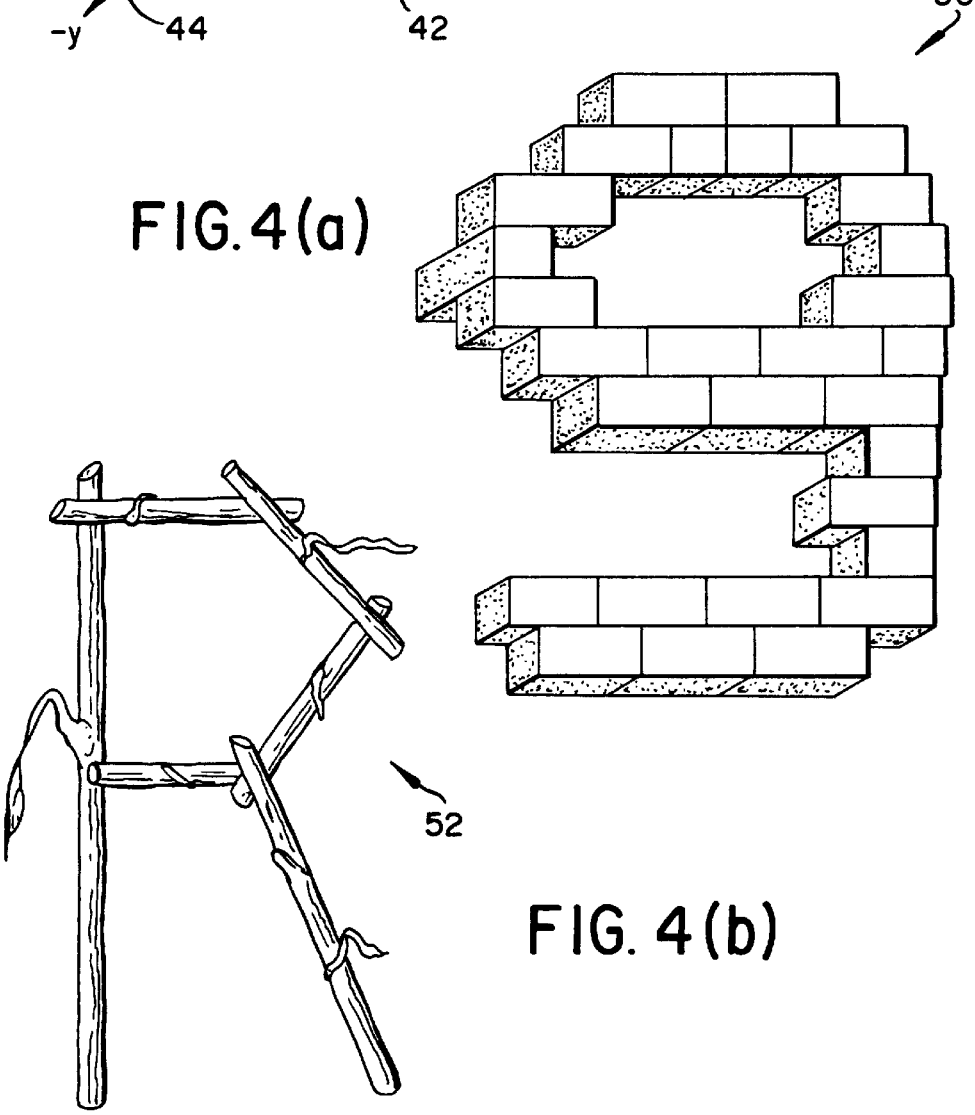
FIG. 4(a)
FIG. 4(b)

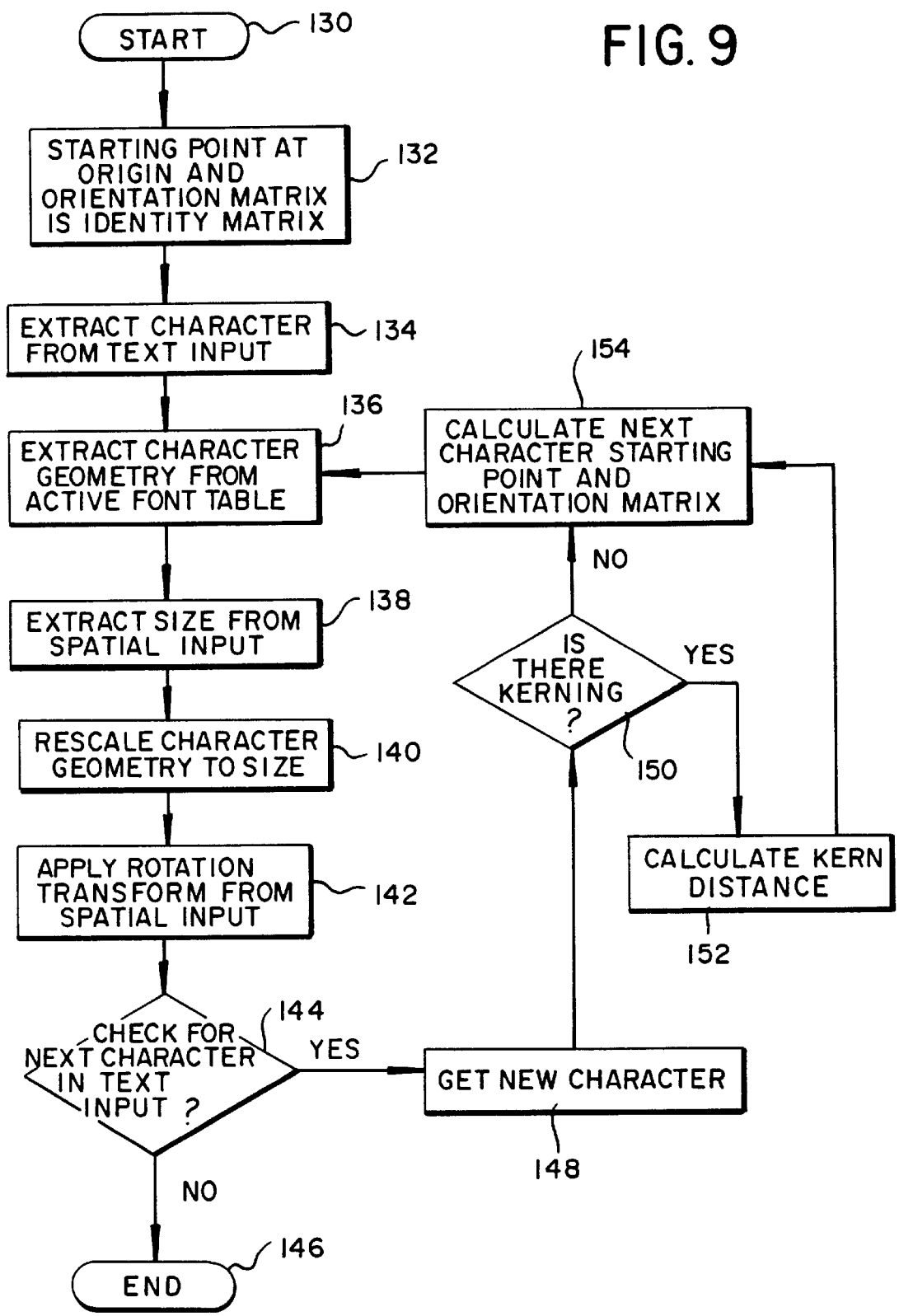

METHOD AND APPARATUS FOR CREATING STORING AND PRODUCING THREE-DIMENSIONAL FONT CHARACTERS AND PERFORMING THREE-DIMENSIONAL TYPESETTING

This is a Continuation of application Ser. No. 07/884,969, filed 15 May 1992 now abandoned.

CROSS REFERENCE TO RELATED APPLICATIONS

This application is related to U.S. applications entitled "Electronically Interpolated Integral Photography System", having U.S. Ser. No. 08/195,231, filed Feb. 14, 1994, now U.S. Pat. No. 5,455,689, which is a continuation of U.S. Ser. No. 07/722,713 now abandoned and entitled Method And Apparatus For Creating Geometric Depth Images Using Computer Graphics having U.S. Ser. No. 07/884,001, pending all assigned to Eastman Kodak Co. and incorporated by reference herein.

BACKGROUND OF THE INVENTION

1. Field of the Invention

The present invention is directed to creating, storing and producing three-dimensional fonts and, more particularly, to a system in which a three-dimensional font character represents a font character and may be any set in three dimensions which can be described by a collection of mathematical relations such as the composition of geometric objects and where these fonts can be used for three-dimensional text construction in electronically composed images, such as typesetting computer graphical images and depth images.

2. Description of the Related Art

Digital fonts have been used since the advent of dot-matrix printing for the representation of text in two dimensions. Digital fonts provide a method for conventional typewriter generated characters such as letters and symbols, e.g., e,*,#,/T, to be mapped to an N×M pixel grid which can then be displayed by a printing head, laser or cathode ray gun. Users of the text can apply these fonts by digitally setting type for documents, graphics arts and television. Most often, text has been displayed as having no thickness. With the increasing popularity of computer graphics, text is more often rendered in three dimensions. A trivial extension of the use of fonts into the third dimension would be as texture maps. For example, a font could be used to typeset a page of a document, and then the text could be mapped as a texture onto a curved surface. While this puts text into a three-dimensional environment, the text itself does not have any three-dimensional character. The next level of extension of the text into three dimensions adds a thickness to all font characters. The fonts are still stored as two-dimensional objects, but by the definition of a thickness, the data can converted into three dimensions. Some existing tools take standard two-dimensional typefaces and allow them to be extruded into three dimensions, but there is a general lack of tools for font creation, font character generation and typesetting in the three-dimensional environment (see "Designer Letters,", "Computer Graphics World," November, 1991, pp. 73–78). An extruded font has its basic description as an outline or a bit map, (i.e., A bit map is defined as a two-dimensional array, A, of arbitrary size, say n×m, where the entries of the array are either 0 or 1, i.e., $A_{ij} \in \{0,1\}$, i=1, 2, ..., n, j=1, 2, ..., m), which are conventional storage methods for two-dimensional fonts. Taking a cross-section of an extruded font character recovers the original character as it was described by traditional font description means such as the bit-map or outline. The storage representation for an extruded font character comprises a thickness for the font character and a two-dimensional font character description given by a mathematical description means for a two-dimensional set such as the bit map or the outline. FIG. 1a illustrates a bit map 8 of a text character and FIG. 1b illustrates extrusion 9 of the bit map of FIG. 1a. Extruded font characters are a very restricted class of font characters when compared to the class of three-dimensional font characters. What is needed is a more general description means for font characters in three dimensions than previously extruded font characters. This description would be of a true three-dimensional font character defined in three dimensions and stored as three-dimensional representation of the font character rather than as extrusions of two-dimensional font characters. A need exists for a simple method of typesetting these three-dimensional font characters in three dimensions. These fonts could be displayed in static two-dimensional media such as photographs or dynamic two-dimensional media such as television as well as in three-dimensional media such as holograms or lenticular images.

SUMMARY OF THE INVENTION

It is an object of the present invention to create a three-dimensional nonextruded font.

It is another object of the present invention to create an image using three-dimensional font text characters.

It is also an object of the present invention to provide a method for describing three-dimensional fonts and three-dimensional typesetting.

It is an object of the present invention to describe font characters as objects in three-dimensions.

It is also an object of the present invention to be able to retrieve polygonal-based descriptions of font characters.

It is a further object of the present invention to describe texture maps and surface properties for each surface of a polygon based geometric text character.

It is another object of the present invention to be able to retrieve the description of font characters based upon other geometric primitives models, i.e., spheres, cylinders and superquadrics.

It is another object of the present invention to allow retrieval of a normal vector for vertices of font character polygons to pass to a rendering engine to be used for advanced rendering methods that create smoother looking surfaces, e.g.., Phong shading.

It is also another object of the present invention to automatically scale, position and orient a plurality of font characters from a plurality of fonts in three dimensions.

It is another object of the present invention to provide the ability to manipulate three-dimensional text with standard typographic functions before constructing the final character geometry to be rendered.

It is another object of the present invention to provide the ability to manipulate three-dimensional text with new typographic functions relevant to text manipulation in the third dimension before constructing the final character geometry to be rendered.

The above objects can be attained by a system and method for creating three-dimensional font text characters using graphic three-dimensional object creation techniques and processors. The text characters can be stored as a set description or more preferably as geometric models. The text characters stored as geometric models or set descriptions or representations are scalable to any size and orientable in any orientation. The text character geometric models are stored in a font storage in a standard geometric model notation, such as a vertex notation and the set characters are stored as set descriptions. When a user specifies text characters to be used in an image along with the font to be used for the text characters, the three-dimensional representation of the specified text characters of the font are retrieved. If a set representation is retrieved, the representation is converted into a three-dimensional set plot. Relative positioning of the text characters with respect to each other in a world coordinate system can be specified to typeset the characters. Appropriate scaling and surface texture designation operations are performed for the plot or model as designated by the user to create three-dimensional text character models as typeset. These text character models are transferred to a graphics processor to be manipulated as desired by the user. A view or a plurality of views of the overall graphical model in the graphics processor, which can include other non-text geometric models, can be generated. There are many uses for the views, created by the graphics processor, of a graphic model containing text and non-text models. One application is in the creation of standard two-dimensional images. For example, architects can provide a client with views of a design from different perspectives where the design includes three-dimensional text characters. Another application is to make an animated sequence from a plurality of images which may have different viewpoints and varying graphic models. Another application, which is not as common as the preceding applications, uses a plurality of images created from the same graphic model but with the different viewpoints and combines them. The application which uses a plurality of views from the same graphic model from several viewpoints comprises the storage, combination and output of the views as follows. The views are generated and combined into a composite output image with image lines from different views interleaved. The output image, in the form of a photographic print or transparency or a cathode ray tube display is combined with a lenticular overlay to create a depth image with three-dimensional text characters. Images which display the results of the views of three-dimensional text rendered with or without other three-dimensional models will be referred to herein as three-dimensional text images or depth text images.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 illustrates a general three-dimensional text character according to the present invention;

FIGS. 4(a)–4(b) illustrate further three-dimensional text characters according to the present invention;

FIG. 9 illustrates some of the operations of FIG. 7 according to the present invention in more detail.

DESCRIPTION OF THE PREFERRED EMBODIMENTS

Figure 1A:
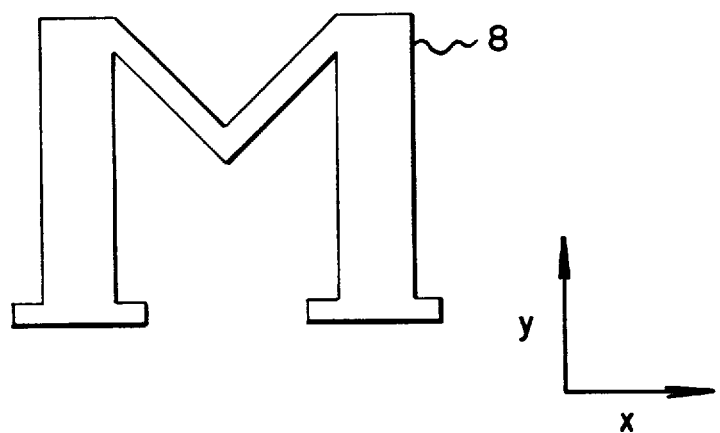
FIGS. 1a and 1b illustrate an extruded bit map text character.
Figure 1B:
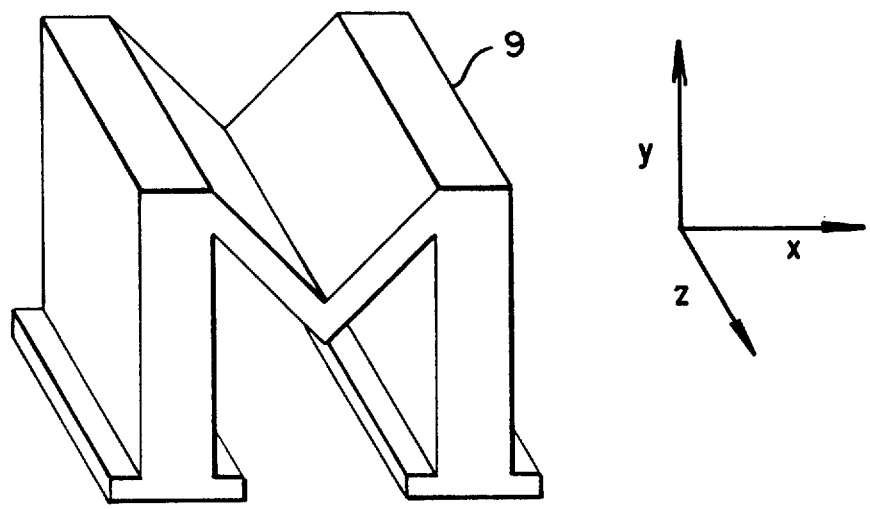

The present invention is a method and apparatus for storing three-dimensional font characters and retrieving them to be manipulated, both using conventional type setting manipulations as well as orientation manipulations of the text in three dimensions, and output in a format which is integrated and rendered with other three-dimensional objects to produce a depth text image. The use of a special class of three-dimensional fonts, referred to here as extruded fonts, are commonly used in images for television and other electronically rendered images. The present invention allows for a much more general description method for a three-dimensional font which includes, but is not restricted to, conventional two-dimensional fonts or their extrusions into conventional extruded fonts. The general description method for three-dimensional fonts is based on mathematical set theory. The method for describing font text characters by mathematical set theory will be illustrated using conventional two-dimensional characters and their extrusions. Finally, the generalization of the method will be made to descriptions of three-dimensional font text characters by mathematical set theory.

A mathematical set theory description of a conventional two-dimensional font character would consist of a description of the set of two-dimensional points which lie within the font character. This could be done by describing the two-dimensional font character as the union of pixels within the font character as in the case of a bit map font. In the case of an outline font, a collection of mathematical equations delineate the boundary between the inside and the outside of the font character. These are just two of a plurality of methods which could be used for describing by the set of points in a font character. There are mathematical set methods which can be but have not been used to describe font characters in two dimensions, but in general, they would describe a two-dimensional font character as a compact subset of a two-dimensional plane. This set in the plane will be denoted by F. To extend this set in the plane to a three-dimensional environment above plane into three dimensions by the mapping E:

$$E:F(x,y) \rightarrow (F(x,y),0) \qquad (1)$$

If we select an arbitrary constant r>0, a primary extruded font character is either the set Extruded which is defined by the relation:

$$\text{Extruded} = \{(x,y,z) \; (x,y) \in F$$

and $$0 \leq z \leq r\} \qquad (2)$$

or the boundary of Extruded. A secondary extruded font character that is a set in three-dimensional space is an isometric affine transform, i.e., a combination of an orthogonal transformation and a translation of a primary extruded font character. Clearly, the set of primary extruded font characters is a subset of the set of secondary font characters. An extruded font character can be any secondary extruded font character. The term primary font character will be used in situations where the emphasis should be placed on the fact that the character description is generated from a two-dimensional surface in the x-y plane which has been extruded in the z direction and embedded in a three-dimensional space with coordinate directions x, y and z. Thus, the description of extruded font characters by mathematical set theory could be thought of as a description of a compact set in two dimensions which was extruded into the third dimension to become a primary extruded font character and then translated and rotated to become a secondary extruded font character.

Mathematical set theory descriptions of three-dimensional font text characters are more general than that of extruded font characters since a component of the font character description does not have to contain the set description in two dimensions. For the three-dimensional font character description, the set is described as a set in three dimensions. A point (x,y,z) is in the font character if it satisfies some collection of mathematical relations. For example, the font character for the letter "o" could be a sphere. The set of points in a sphere of radius r is defined in a conventional mathematical set notation by:

$$\{(x,y,z) | x^2+y^2+z^2 \leq r^2\} \quad (3)$$

Similarly, points in the font character number "8" could be described by mathematical set notation as the union of two spheres as:

$$\{(x,y,z) | x^2+y^2+z^2 \leq r_2\} \cup \{(x,y,z) | x^2+(y-2r)^2+z^2 \leq r_2\} \quad (4)$$

Extruded font characters are not a general font description sufficient to include the font characters "o" and "8" made of spheres. Three-dimensional mathematical font character descriptions provide the flexibility which is not possessed by two-dimensional descriptions or extrusion methods to describe this type character composed of spheres. Other font characters exist which are not described by two-dimensional and extrusion methods, and yet are easily described by the three-dimensional mathematical set font description method. The addition of the third dimension to a font (not just an extrusion) provides additional flexibility to personalize a typeface. For example, a three-dimensional font might be called "bevelled", where each character has a triangular cross-section or called "sphere" where each character has a circular cross-section and is made of spheres.

A geometric model font is a specific type of three-dimensional font which in accordance with the present invention is a collection of font text characters in which each character is described as a geometric model or object. A geometric model can be represented by a set of three-dimensional coordinates of vertices and connections and groupings among vertices to determine polygonal partitions in the object. That is, the coordinates with an inherent connection order and grouping, fully define the object. The coordinates and connection order can be represented as an ordered list of vertices of a polygon. The coordinates can also be represented in a three-dimensional vector notation. Edge, line, wire frame, polygon and geometric surface representations can also be used. That is, the essential characteristic of a geometric model font text character is represented by a set of references which each have a three-dimensional representation and provide a complete description of the geometry of the three-dimensional text character. It should be recognized that the geometric font text character description is one method of describing a set of points which constitute the points in a three-dimensional font character. As will be discussed hereinafter, the geometric font text character is the preferred embodiment of a method for three-dimensional font character description, but it should be recognized that there are other means, such as the set description previously discussed, of describing or approximating the set of points in three dimensions which constitute the three-dimensional font text character and rendering the font description in viewable form. Furthermore, the text characters of a geometric model font are preferably described as a collection of primitives and each primitive is made up of polygons where each polygon is a collection of three-dimensional vertices described as floating point numbers and other optional information including three-dimensional surface normals described as floating point unit vector numbers. This optional information will be described in more detail below. Coordinate systems, other than the Cartesian coordinate systems, such as polar or cylindrical, may be used in the description or stored representation of geometric model fonts.

The present invention includes a variety of inputs to describe the text, a set of stored three-dimensional fonts, processing means for converting the requested text into a geometrical description of the type, means for describing the three-dimensional relationship between typed characters, processing means for combining the geometry of the type and the spatial relation between the characters into a geometrical model of the type in a global coordinate system, and rendering interface means for incorporating the material properties and texture map information into a description of a type that can be properly interpreted by a conventional rendering engine.

Figure 2:
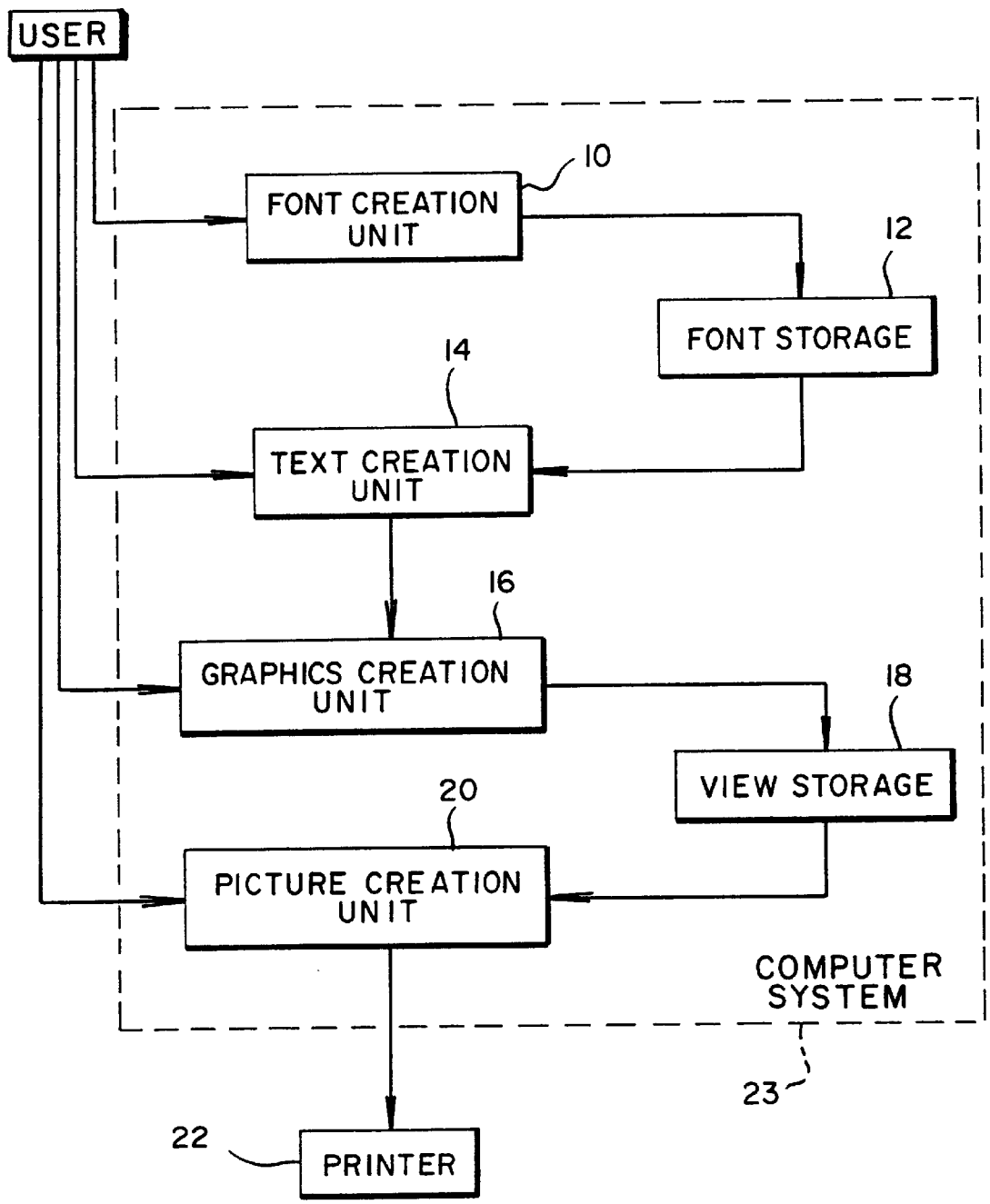
FIG. 2 depicts the general sequence of the processes and the hardware of the present invention.

The present invention, as illustrated in FIG. 2, includes a font creation unit 10 which is used to create the three-dimensional geometric model object representation of the various text characters in a desired alphabet. The font creation unit 10 includes an interactive graphics package such as MODELER available from Wavefront which can be used to create three-dimensional models of three-dimensional objects. The font creation unit 10 can also include a graphics package such as MATHEMATICA available from Wolfram Research that allows objects to be interactively described as a set using conventional mathematical set notation. This graphics package also allows the user to view and change the object described by the set notation. The user interacts with the selected graphics package to create font characters for each letter of the desired text output in the same way that a user interacts with such a graphics package or process to graphically design other graphical objects such as parts to be machined by machine tools, buildings to be built or any other physical objects that can be represented as three-dimensional models or as a set. Once a three-dimensional text character is created, it is stored in font storage 12 in a convenient representation, such as the vertex type notation described herein for a geometrical font character or the set notation previously discussed. The user then can select text to be three-dimensionally rendered, such as "KODAK" and specify to a text creation unit 14 the text, the font, the dimensions of the characters, the texture and material in which the characters are to be rendered. The text creation unit 14, the operation of which will be described in more detail with respect to FIGS. 7 and 9, retrieves the representation of the text characters specified by the user in the font specified by the user and creates three-dimensional type character models which are transferred to a graphics creation unit 16. In the case of a geometric font, the geometric model is transferred and in the case of a set font the set plot is transferred. The text character models can be transferred to the graphics creation unit 16 one character at a time or as a string of characters with predefined typesetting relationships therebetween. The graphics creation unit 16 includes a graphics process in a graphics package, such as the systems mentioned above, which allows the user to orient, scale, change the texture and material of and otherwise manipulate the text models as graphical objects in any way desired. Once the graphical model is arranged as desired, the model is rotated or shifted to a desired viewpoint or view for the creation of a depth text image. For example, some images are constructed and viewed from a single viewpoint while other images require a temporal sequence of views, such as in an animation of motion around the font text characters or animation of the text characters themselves. Still other images require a spatial sequence of views such as in depth imaging or holography. It should be understood that all images created containing realizations of three-dimensional font text characters are considered depth text images, and are not limited to those media described here. There are numerous applications of depth text in conventional imaging methods as well as in novel imaging technologies. The application of depth text in a novel imaging technology, depth imaging, and the special processing requirements thereof will be explained in more detail.

If a depth image of the lenticular type is being created, plural spatial views are selected for producing a depth image and the display for each of the views is stored in a view storage 18 as a conventional pixel representation of the display. As many views as is desired can be stored in this way by simply rotating or shifting the text character model to the desired viewpoints and storing the output of the display. At least twelve views are recommended for an acceptable quality depth image. The model can be rotated or shifted manually by the user to capture the views or the user can define a central view and a computer, using the process described in the related computer graphics application, can automatically create and store the views. Once the views are stored, a picture creation unit 20, which performs the functions described in the related photography system application previously mentioned, is used to create a depth image suitable for an appropriate media, such as a lenticular photograph. The lenticular photographic image is output to a printer 22, such as the preferred LVT model 1620B printer from Eastman Kodak Co., and printed, thereby creating a lenticular type depth image. Other output devices such as a TV can be used if appropriate lenticular or barrier strip overlays are created therefore. The units 10, 14, 16 and 20 as well as storages 12 and 18 are shown as separate units, however, as depicted by the dashed line, the functions of the units 10, 14, 16 and 20 and the storage by the storages 12 and 18 can be within a computer system 23, such as the AT&T pixel machine in combination with a SUN workstation.

FIG. 3 illustrates a three-dimensional font character. In particular, this font character is a geometric model font text character created using polygons in accordance with the present invention. The geometric text character 30 is referenced to a three-dimensional unit volume 32 which has associated therewith an orientation vector, a scale vector and a translation vector 34. The orientation vector is a unit vector in the three-dimensional volume and can be used to orient the text character 20 with respect to a reference or global coordinate system. The scale vector is used to modify the unit volume size by multiplying the height, width and depth of the volume. The translation vector places the font character relative to the origin of the local coordinate system. The text character is comprised of a number of polygonal surfaces, such as surface 36, which are defined by the vertices of the surface, as will be discussed in more detail later. The description of a font character in accordance with the present invention, either of the set or geometric type, is very different from the description of fonts in the prior art. This difference provides benefits in rendering and manipulation of the characters not provided in the prior art. The descriptive difference also creates a character that can have physical characteristics substantially different from prior art font descriptions. Of particular interest in this regard is the surface 38 which has a varying surface normal which varies across the surface horizontally with respect to the viewpoint of FIG. 3, such that the normal need not be parallel to any of the reference axes 40, 42 and 44 and which surface normal, at the same time, need not be parallel to any of the planes formed by the axes 40, 42 and 44 defining the volume 32 in which the character 30 resides. Extruded characters do not have this capability and as a result are not true three-dimensional text characters but just extensions of a two-dimensional font into a three-dimensional space.

FIGS. 4(*a*) and 4(*b*) illustrate other font possibilities in which the font 50 is comprised of three-dimensional bricks where each surface of each brick is defined in accordance with the present invention and FIG. 4(*b*) illustrates a font constructed of sections of a cane plant. In the situation of the cane plant font, the cane sections would be designed using cylinder geometric models while the leaves of the cane and protrusions associated with the cane joints would be created using randomly located polygonal surface representations. In this situation the cylinders of the canes run perpendicular to the font orientation which is the opposite direction of extension which would occur when cylinders are extruded in the conventional two-dimensional extrusion process. Both of the fonts in FIGS. 4(*a*) and 4(*b*) can be created using the graphics design package previously mentioned and particularly easily using the geometric primitives approach described later herein.

Figure 5:
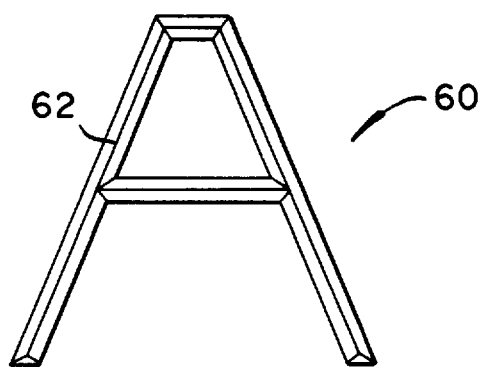
FIG. 5 depicts a bevelled text character according to the present invention.
Figure 6:
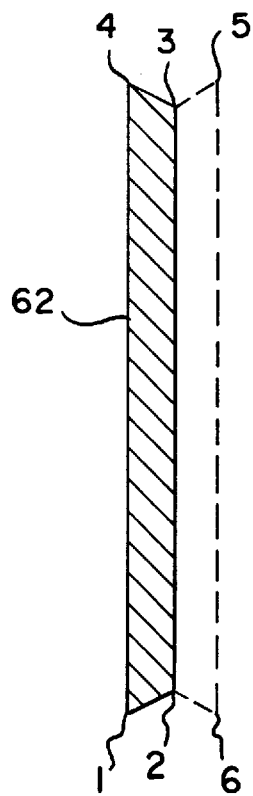
FIG. 6 illustrates the graphical surface representation according to the present invention of one of the surfaces or faces of the text character of FIG. 5.

FIG. 5 depicts a bevelled font 60 in which the surface 62 is illustrated in FIG. 6 as constructed from a series of vertices 1–4 or equivalently three-dimensional vectors. Vertex 1 is located at coordinates (x1,y1,z1) and has a normal vector (nx1,ny1,nz1). The normal vector is optional and is used by the graphics package in creating or smoothly blending the surfaces and surface textures of the graphic model, an example of this is the so-called Phong shading process. Vertex 2 has coordinates (x2,y2,z2) with normal vector (nx2, ny2,nz2), vertex 3 has coordinates (x3,y3,z3) with normal vector (nx3,ny3,nz3) and vertex 4 has coordinates (x4,y4,z4) with normal vector (nx4,ny4,nz4). The surface 62 is preferably represented in font storage 12 as a list of vertexes having the form:

vertex 1
x1, y1, z1, nx1, ny1, nz1
vertex 2
x2, y2, z2, nx2, ny2, nz2
. . .
vertex v
xv, yv, zv, nxv, nyv, nzv Other optional entries for each vertex entry in the list include a color descriptor, a texture map index number, a two-dimensional texture map coordinate, a bump map index number and a two-dimensional bump map coordinate. The color description could include an index to a color map or an actual n-bit color. Other geometric object characteristic parameters available in graphic processing systems could also be included.

The vertex list is preferably represented in a vertex table where each entry in the table, if only the surface normal option is chosen, comprises six numbers, as shown above, three of which give the position of the vertex in three dimensions and the other three of which describe the three-dimensional normal vector.

The polygons which comprise the particular text character are stored in a font table which comprises a list of polygons which describe the character. As set forth below each polygon comprises a list of vertex numbers which refer to the vertex numbers of the vertex table.

---

Polygon 1
    vertex 1, vertex 2, vertex 3, vertex 4
Polygon 2
    vertex 2, vertex 3, vertex 5, vertex 6
. . .
Polygon n
    vertex v-3, vertex v-2, vertex v-1, vertex v

---

The list of vertices describes a self-connected path in three-dimensional space for three-dimensional font characters and the vertices are assumed to be coplanar. For simplicity, and without loss of generality, the polygon is the convex hull of the vortices. Mathematically, a point p is in the polygon if there is a set of n numbers, $$(r_1, \ldots, r_n), \text{ such that } 0 \leq r_i \leq 1, \text{ and} \quad \sum_{i=1}^{n} r_i = 1 \quad (5)$$

where $$p = \sum_{i=1}^{n} r_i v_i \quad (6)$$

The collection of all such points defined as above is known as a polygon. A font character is the set-theoretic union of all defined polygons. A font character symbolically is:

$$\text{CHARACTER} = \cup \text{Polygons} \quad (7)$$

i.e., the combined regions described by the set of polygons. For a general three-dimensional font text character description as a set, there must be means of translating the description as a set into a form handled by the renderer such as geometric primitives or three-dimensional set plot, a capability provided by the MATHEMATICA package previously mentioned.

The font table is indexed by the font type and the polygon list is indexed within the table by the text character. For example, the bevelled font would be found by searching the font memory for the "bevelled" font table and the polygon list within the bevelled font table for the text character "A" would be found by searching or indexing through the polygon list for the character "A" entry. This data structure can also carry depth, width, height and length information and mapping information, etc. for typesetting purposes. The character size information can be carried explicitly as a header of a few floating point numbers or the computer could scan the actual vertex data for maximum and minimum data values (coordinates) to save storage space but use more computer time. The font character can be considered as being contained in a unit volume or cube as illustrated in FIG. 2. This is analogous to a solid piece of type. The font character can be rotated, translated, and scaled as desired which is simply a mapping of the cube into the local coordinate system of the output system. This mapping information could also be carried as selectable options within the data structure. More elaborate mappings can also be performed. For instance, if a mapping H:C--->C is initially performed some very unique fonts could be readily derived from the initial font set. As an example consider the mapping $$H(x,y,z) = (x, (1-x/2)y, (1-x/2)z) \quad (8)$$

This mapping would produce a font that had an appearance of being pinched.

Figure 7:
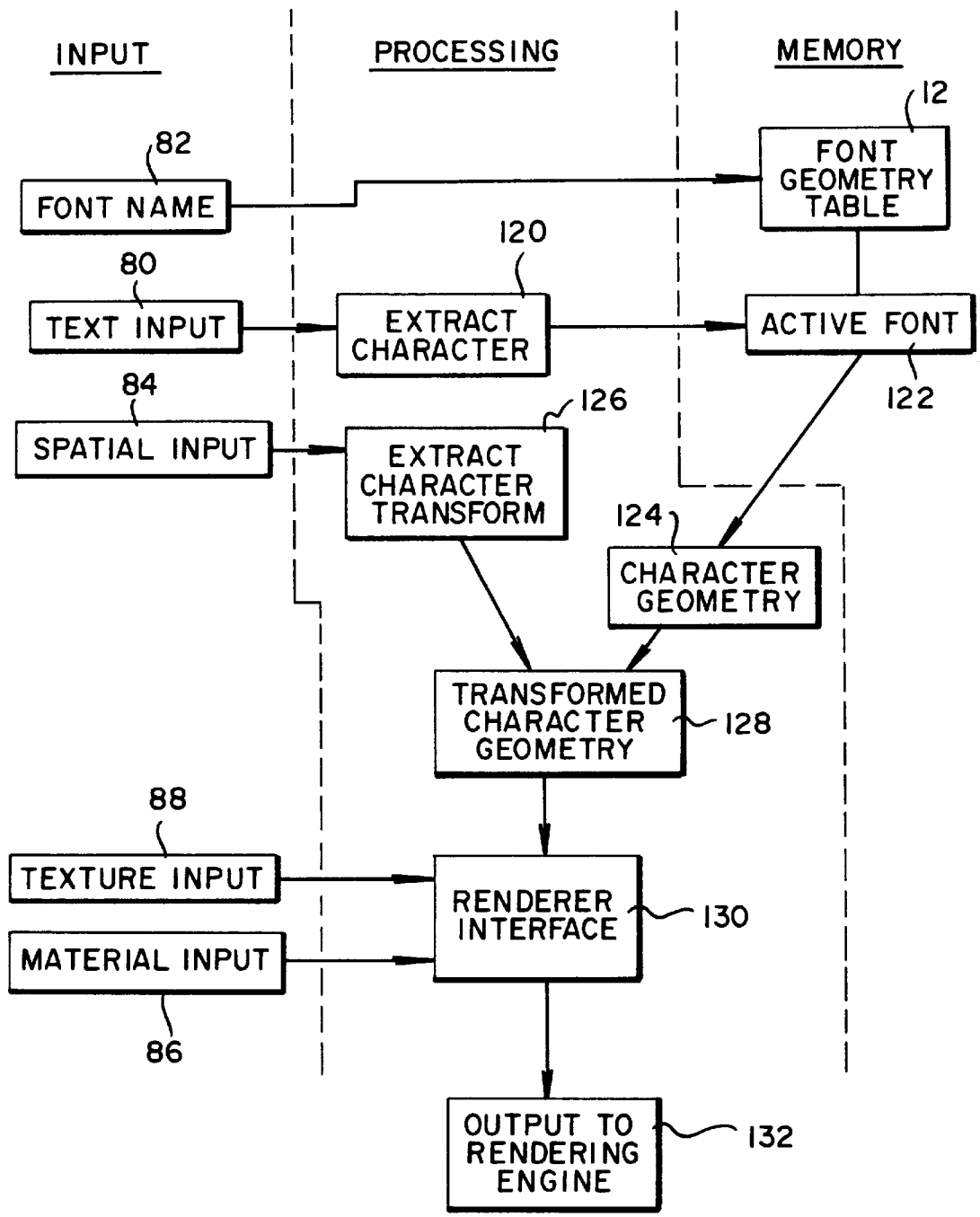
FIG. 7 illustrates the operations of the text creation unit of FIG. 1 according to the present invention.

The inputs necessary to describe the text to be reproduced as three-dimensional text includes a variety of inputs: a text input 80, a font name 82, a spatial description input 84, a material input 86 and a texture input 88, as illustrated in FIG. 7.

The spatial description input 84 can include descriptions of how the characters will be positioned and oriented in three-dimensional space, such as a world coordinate system, as well as the resolution at which the characters should be formed. The spatial input description can include a conventional orientation matrix which is a description of a transformation which rotates the character and can be considered as a change of coordinates, such as to a world coordinate system. The description could also include a transformation matrix which translates the character to a different position in the world coordinate system. These matrices could be combined into a single matrix. The spatial input description could also be of the form:

--- displacement vector 1 (x1,y1,z1)
orientation vector 1 (x2,y2,z2)
polygon list 1 (letter designator)
displacement vector 2 (x3,y3,z3)
orientation vector 2 (x4,y4,z4)
polygon list 2 (letter designator)
.
.
.
displacement vector n (xm,ym,zm)
orientation vector n (xp,yp,zp)
polygon list n (letter designator)

---

Figure 8:
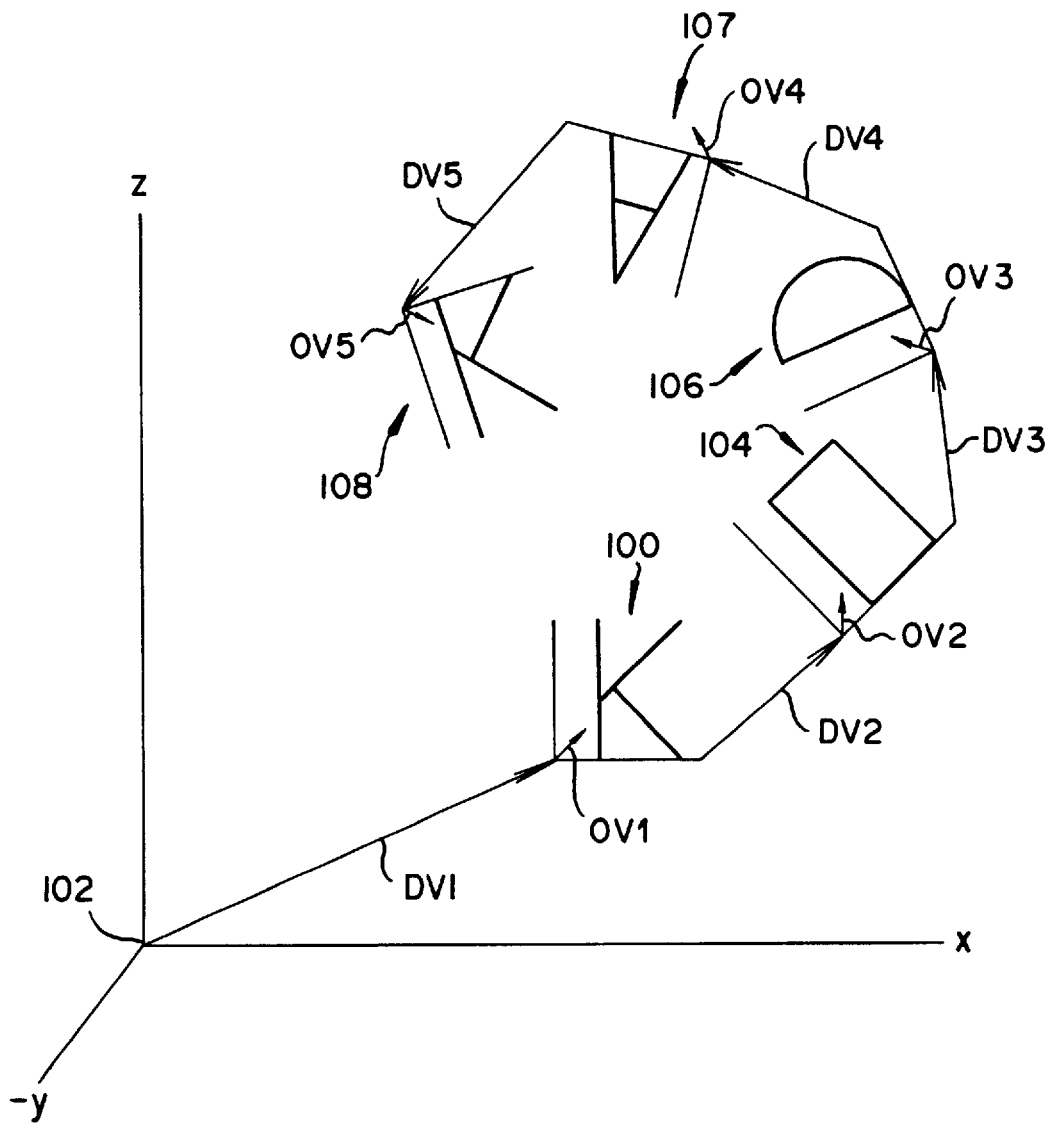
FIG. 8 illustrates linking several text characters together according to the present invention.

This form is represented in FIG. 8 which shows a displacement vector DV1 providing a three-dimensional displacement to the position of the first letter 100 in an arbitrary world coordinate system 102. The orientation vector OV1 in the list corresponds to the orientation vector mentioned with respect to FIG. 3 and represents the orientation with respect to the coordinate system 102. Second, third, fourth and fifth displacement vectors DV2–DV5 for text characters 104–106 which include corresponding orientation vectors OV2–OV5 are shown. FIG. 8 is intended to represent the text characters "KODAK" twisting in a spiral relationship away from the viewer such that the letters turn around backwards.

The text input 80 (FIG. 7) includes the characters which will be typeset. The font name of the text input describes the font to be used to form the characters of the text and whether the characters will be bold or underlined. The texture input 88 and material input 86 are required by the rendering graphics package and are used in standard computer graphical methods for describing surface properties. The material input 86 describes the material surface properties of the characters such as color, transparency, specularity, index or refraction and reflectivity while the texture input 88 describes both the variations and surface coloration and surface normals, that is, whether the surface has variations such as bumps. The texture 88 and material 86 inputs are standard inputs for conventional computer graphics methods of describing surface properties (See Foley et al., Fundamentals of Interactive Computer Graphics, Addison Wesley, 1982).

The text input, as illustrated in FIG. 7, is conventionally parsed to extract 120 the identity of each of the characters and the font name. The font name is used to determine which set of character descriptions are active and the appropriate font table for the active font 122 is retrieved from the font storage 12. The character descriptions, in the form of set descriptions or polygon lists and vector lists for the polygon are retrieved from the font table for each of the characters individually or as a string of characters and are used to define the character geometry 124. If the character description is a set description the set description is converted into a graphic plot (points with coordinates) using a package such as the MATHEMATICA package previously described. The spatial input parameters relating to text character relationships, size, resolution, etc. are extracted 126 from the spatial input 84 by conventional parsing and used in a conventional transform operation 128 to appropriately transform the character to the desired size and orient the characters with their normals in three-dimensional space. The spatial input can also include line spacing, relative character orientation and character size information. The operations of steps 120, 124, 126 and 128 are described in more detail with respect to FIG. 9. The transformed character is then combined 130 with the texture 88 and material 86 inputs to place the character model information, for each individual character or for the string of characters, into a form which can be accepted by a conventional rendering engine. The format accepted by the Wavefront graphics package previously mentioned includes a polygon list, a list of vertices associated with each polygon and a list of coordinates for each vertex. A person of ordinary skill in the art can easily modify or adapt the preferred character description discussed herein to the format for other graphics packages. The formatted character model data is then output 132 to the graphics package which will combine the text with other graphic model objects. The graphic package then creates, as previously discussed, the view or views suitable for depth text images interactively with the user or automatically. If multiple views, as needed for depth images, are produced, the views are then formed into a depth image as previously discussed.

The method of FIG. 7 takes as one input the geometry of the individual characters described in their local coordinate systems and as another the spatial input to calculate the position of all characters in a global coordinate system. To accomplish this, a complete transformation of local coordinates must be derived. It consists of a standard three-dimensional translation (displacement) vector and a 3×3 matrix transform. The complete transform conventionally acts on the coordinates of the vertices, and the normals require only the 3×3 transform. The complete character transformation is calculated from the character geometry, which determines the fundamentals of the individual character, and the character translation transform which determines the spatial relationship between characters. The spatial relationship is derived from the spatial input information, i.e., line spacing, kerning, relative character orientation and character size. With the complete transform, the system can transform the vertex positions, and normals if this option is chosen, for relocating the characters based in their local coordinates to the global text coordinates in accordance with the spatial input. This positions and orients the characters of the text relative to each other in the global three-dimensional space.

The system of the present invention starts the operation, as illustrated in FIG. 9 by setting 132 the typesetting starting point as the origin of a global coordinate system and designating an orientation matrix as the identity matrix. A character is extracted 134 from the text input and the character is found and retrieved 136 from the font memory. If the character is described as a set the set description is converted into a plot or geometric vector type description. The size (width, length and height) of the character is extracted 138 from the spatial input and the vertices are scaled 140 from a unit notation to the size desired. The character is then conventionally rotated 142 to orient it with respect to the global coordinate system as specified by the spatial input. The description of the character is preferably stored in a linked list for later transfer to the rendering engine. Other temporary storage techniques of course could be used. A determination is then made 144 as to whether additional text characters exist in the input and if so a new character is extracted 148. If the new character requires kerning 150, that is adjustment of the distance between the letters to allow an overhang or overlap, the kern distance is calculated 152. The starting point of the next character, with respect to the previous character, as well as the orientation matrix for that character is then calculated 154. The process of extracting 136 characters from the memory and the text continues until all input text characters are processed. Although the font character can be represented as set or geometric descriptions, the geometric description is preferred because the speed of processing is faster since the set description requires conversion to a geometric plot description. The geometric description can also be used with a wider variety of graphics packages. As a result, in the present invention, fonts are preferably a collection of fundamental units that represent graphic information. The font characters preferably are created and prestored as geometric graphic objects in a font storage. The fonts have been referred to as characters and can include upper and lower case letters of alphabets, arabic numerals, kanas, typewriter symbols, chinese radicals and other graphics primitives like arrows. The prestored geometric representations of the characters are retrieved and used as graphical objects in creating a graphical model which is then converted into a depth image such as a depth image in a depth image technology, such as the preferred lenticular technology.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, the text characters have been described with respect to being rendered and viewed using lenticular technology. The characters, however, can be rendered in other three-dimensional technologies, such as holographic, barrier, autostereographic, television and computer aided drafting. The text characters have been described with the respect to both a set description and polygonal description implementation, however, it is possible for the font memory to store stick figures with cross sections of the stick figures or any other character description that describes the complete geometry of the three-dimensional text character. For example, another geometric description suitable for the font memory is a stroke method in which strokes of the character, with three-dimensional stroke starting and ending points, are defined and a standard three-dimensional building block or primitive of vertices for each font is defined where the building block is fit to or reproduced along the strokes when building geometric objects to pass to the rendering engine.

What is claimed is:

1. A method of typesetting a three dimensional image comprising a plurality of text characters, the method comprising the steps of:

(a) user selecting a plurality of characters as an input;

(b) retrieving a three-dimensional set representation of one of the characters from a stored set of three-dimensional set representations of the characters each having a dimension in each of three orthogonal directions and defining all points of the character;

(c) then identifying another one of the plurality of characters in the input and retrieving a three-dimensional set representation of the other one from the stored set;

(d) positioning in three dimensions, each of the retrieved three-dimensional characters in relation to one another using previously input line spacing, kerning, relative character orientation and character size information;

(e) converting the three-dimensional set representations into a view of the plurality of characters; and (f) creating on a media an image with the view.

2. A method according to claim 1 additionally comprising selecting a surface property for the plurality of characters, and wherein the view is created on the media with the selected surface property.

3. A method according to claim 1 additionally comprising selecting a surface property for the plurality of characters, wherein the surface property is selected from color, transparency, specularity, index of refraction, and reflectivity, and wherein the view is created on the media with the selected surface property.

4. An apparatus for typesetting a three dimensional image comprising a plurality of text characters, comprising:

a printer for printing a lenticular image; and a computer connected to said printer and comprising:

character specifying means for geometrically specifying, for each of the text characters, a three-dimensional geometric model text character with polygon surface primitives having a dimension in each of three orthogonal directions and a three-dimensional position of the depth text character in a three-dimensional coordinate system;

character creation means for transforming the three-dimensional geometric model text character into a graphic object at the position in the three-dimensional coordinate system;

positioning means for positioning in three dimensions, each of the graphic objects in relation to one another using previously input line spacing, kerning, relative character orientation and character size information, rendering means for rendering the positioned graphic objects from different views; and lenticular image means for creating the lenticular image from the views and sending the lenticular image to said printer.

5. A method of typesetting a three dimensional image of the lenticular type comprising a plurality of text characters, comprising the steps of:

(a) user selecting a plurality of characters as an input;

(b) retrieving a three-dimensional set representation of each of the text characters from a stored set of three-dimensional set representations of text characters each having a dimension in each of three orthogonal directions and defining all points of the text character;

(c) positioning in three dimensions, each of the retrieved three-dimensional characters in relation to one another using previously input line spacing, kerning, relative character orientation and character size information;

(d) converting the set representations of the retrieved text character into views of the plurality of text characters; and (e) creating on a media a depth text image of the lenticular type with the views of the plurality of text characters.

6. A method of typesetting a three dimensional image of the lenticular type comprising a plurality of text characters, comprising the steps of:

(a) user selecting a plurality of characters as an input;

(b) retrieving a three-dimensional representation of each of the text characters, from a stored set of three-dimensional representations of text characters each having three-dimensional coordinates of three-dimensional geometric models having surfaces and having a dimension in each of three orthogonal directions;

(c) positioning in three dimensions, each of the retrieved three-dimensional characters in relation to one another using previously input line spacing, kerning, relative character orientation and character size information;

(d) generating from the three-dimensional geometric models views of the retrieved text characters; and (e) creating on a media a depth text image of the lenticular type with the views of the depth text characters.

7. A method of typesetting a three dimensional image of the lenticular type comprising a plurality of text characters, comprising the steps of:

(a) user selecting a plurality of characters as an input;

(b) retrieving a three dimensional representation of each of the text characters as three-dimensional geometric text character models comprising surfaces each having a dimension in each of three orthogonal directions;

(c) selecting ones of the geometric text character models corresponding to the text characters of the depth image text;

(d) positioning the selected ones of the geometric text character models three-dimensionally with respect to each other using previously input line spacing, kerning, relative character orientation and character size information;

(d) transforming the selected ones of the selected geometric text character models into graphic objects;

(e) generating from the graphic objects a depth image of the lenticular type; and (f) displaying the depth image.

8. An apparatus for typesetting depth image text characters, comprising:

means for creating three-dimensional depth model text characters having model surfaces and a dimension in each of three orthogonal directions;

means for selecting a surface property for the plurality of characters from surface properties representing color, transparency, specularity, index of refraction, and reflectivity, and wherein the view is created on the media with the selected surface property; and means for positionally arranging and rendering the depth model text characters as an image with the selected surface property, the depth model text characters being positioned in three dimensions in relation to one another using previously input line spacing, kerning, relative character orientation and character size information.

9. An apparatus for typesetting a three dimensional image comprising a plurality of depth text characters, comprising:

a printer for printing an image; and a computer connected to said printer and comprising:

character specifying means for geometrically specifying, for each of the plurality of text characters, a three-dimensional geometric polygon primitive surface model text character having a dimension in each of three orthogonal directions and a position of the depth text character in a three-dimensional coordinate system;

character creation means for transforming the specified three-dimensional geometric model text characters into graphic objects at respective positions in the three-dimensional coordinate system determined by previously input line spacing, kerning, relative character orientation and character size information;

means for selecting a surface property for the specified characters from surface properties representing color, transparency, specularity, index of refraction, and reflectivity; and rendering means for rendering the graphic objects at the positions from a view as the image with the selected surface property.

10. A method of typesetting a three dimensional image comprising a plurality of characters, the method comprising the steps of:

(a) user selecting a plurality of characters as an input;

(b) retrieving a three-dimensional representation of one of the characters from a stored set of three-dimensional representations of the characters each having three dimensional coordinates of a three-dimensional geometric model of polygon surface primitives having a dimension in each of three orthogonal directions;

(c) then identifying another one of the plurality of characters in the input and retrieving a three-dimensional representation of the other one from the stored set;

(d) positioning in three dimensions, each of the retrieved three-dimensional text characters in relation to one another using previously input line spacing, kerning, relative character orientation and character size information;

(e) converting the retrieved three-dimensional representations into a view of the plurality of text characters; and (f) creating on a media an image with the view.

11. A method according to claim 10 wherein the three-dimensional representations are converted to a plurality of views, and wherein a depth image is created on a media using the image views.

12. A method according to claim 10 additionally comprising selecting a surface property for the plurality of characters, and wherein the view is created on the media with the selected surface property.

13. A method according to claim 10 additionally comprising selecting a surface property for the plurality of characters, wherein the surface property is selected from color, transparency, specularity, index of refraction, and reflectivity, and wherein the view is created on the media with the selected surface property.

14. A method according to claim 10 wherein the characters are text characters.

15. An apparatus for producing a three dimensional image, comprising:

(a) means for allowing a user to select a plurality of characters as an input;

(b) means for storing a set of three-dimensional set representations of characters each having a dimension in each of three orthogonal directions and defining all points of the character;

(c) means for identifying each one of the plurality of characters in the input and retrieving a three-dimensional set representation of each one from the stored set;

(d) means for positioning in three dimensions, each of the retrieved three-dimensional characters in relation to one another using previously input line spacing, kerning, relative character orientation and character size information;

(e) means for converting the three-dimensional set representations into a view of the plurality of characters; and (f) means for creating on a media an image with the view.

16. An apparatus for producing a three dimensional image, comprising:

(a) means for allowing a user to select a plurality of characters as an input;

(b) means for storing a set of three-dimensional representations of the characters each having three dimensional coordinates of a three-dimensional geometric model of polygon surface primitives having a dimension in each of three orthogonal directions;

(c) means for identifying each one of the plurality of characters in the input and retrieving a three-dimensional representation of each one from the stored set;

(d) means for positioning in three dimensions, each of the retrieved three-dimensional characters in relation to one another using previously input line spacing, kerning, relative character orientation and character size information;

(e) means for converting the three-dimensional representations into a view of the plurality of text characters; and (f) means for creating on a media an image with the view.

17. A computer program product, comprising a computer readable storage medium having a computer program stored thereon for performing the steps of:

(a) allowing a user to select a plurality of characters as an input;

(b) retrieving a three-dimensional set representation of one of the characters from a stored set of three-dimensional set representations of the characters each having a dimension in each of three orthogonal directions and defining all points of the character;

(c) then identifying another one of the plurality of characters in the input and retrieving a three-dimensional set representation of the other one from the stored set;

(d) positioning in three dimensions, each of the retrieved three-dimensional characters in relation to one another in response to user input using previously input line spacing, kerning, relative character orientation and character size information;

(e) converting the three-dimensional set representations into a view of the plurality of characters; and (f) creating on a media an image with the view.

18. A computer program product, comprising a computer readable storage medium having a computer program stored thereon for performing the steps of:

(a) allowing a user to select a plurality of characters as an input;

(b) retrieving a three-dimensional representation of one of the characters from a stored set of three-dimensional representations of the characters each having three dimensional coordinates of a three-dimensional geometric model of polygon surface primitives having a dimension in each of three orthogonal directions;

(c) then identifying another one of the plurality of characters in the input and retrieving a three-dimensional representation of the other one from the stored set;

(d) positioning in three dimensions, each of the retrieved three-dimensional text characters in relation to one another using previously input line spacing, kerning, relative character orientation and character size information;

(e) converting the three-dimensional representations into a view of the plurality of text characters; and (f) creating on a media an image with the view.

* * * * *